Patented Apr. 28, 1925.

1,535,435

UNITED STATES PATENT OFFICE.

CARL A. NERACHER, OF SYRACUSE, NEW YORK, ASSIGNOR, BY MESNE ASSIGNMENTS, TO NER-A-CAR CORPORATION, A CORPORATION OF NEW YORK.

MOUNTING FOR VEHICLE WHEELS.

Application filed October 21, 1919, Serial No. 332,244. Renewed July 14, 1924.

*To all whom it may concern:*

Be it known that I, CARL A. NERACHER, a citizen of the United States, residing at Syracuse, in the county of Onondaga and State of New York, have invented new and useful Improvements in Mountings for Vehicle Wheels, of which the following is a specification.

The present invention relates to mountings for vehicle wheels.

The improved construction is applicable more particularly to the front or steering wheel of motorcycle or tricycle types of vehicles, although, as will be apparent hereinafter, the improvement is capable of useful application to other types of vehicles.

More specifically the improved construction is designed for application to the steering wheel of a motorcycle having the rigid side bar frame construction illustrated and claimed in my co-pending application, Serial No. 290,979, filed April 18, 1919.

An object of the present invention is to provide a resilient front wheel mounting for motorcycles which will improve the riding qualities of the cycle.

Another object is to provide a front wheel mounting which facilitates manufacture and assembly.

These and other objects are attainable in the embodiment of the invention herein described and illustrated in the accompanying drawings, in which—

Figure 1:
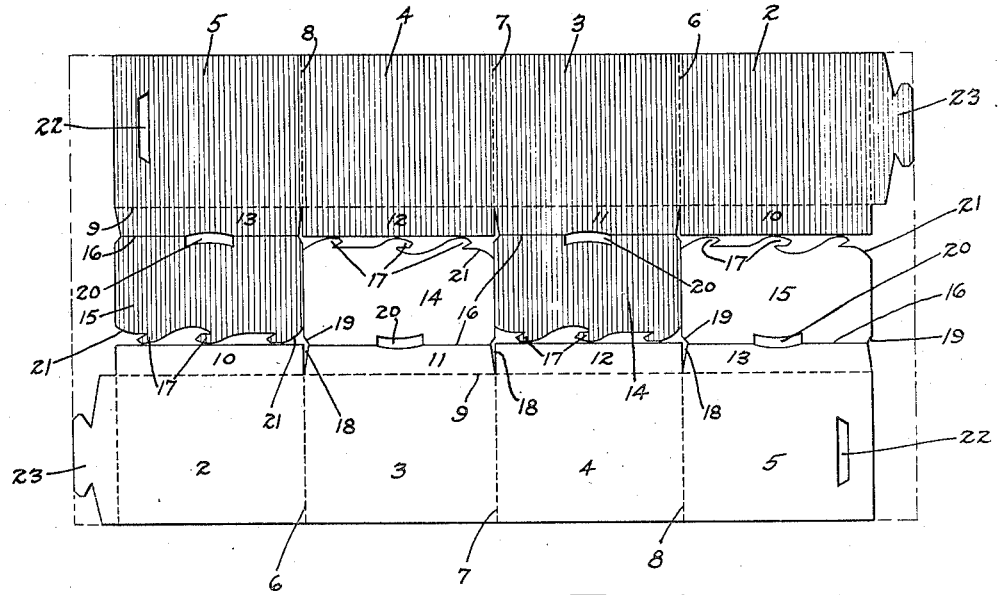
Fig. 1 is a horizontal sectional view through the steering wheel of the motorcycle.
Figure 6:
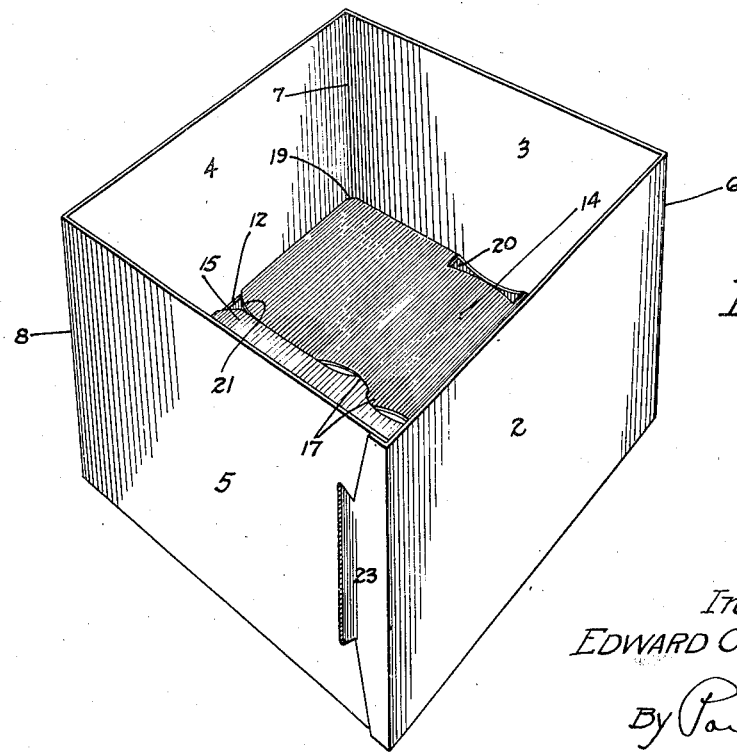
Figure 2:
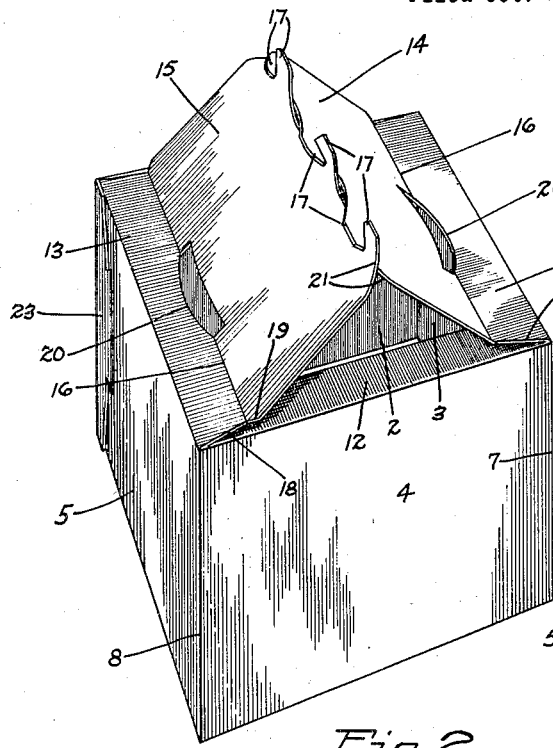
Fig. 2 is a side elevation of the steering wheel.
Figure 3:
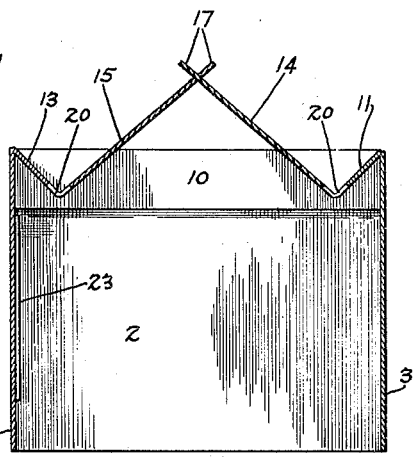
Figure 4:
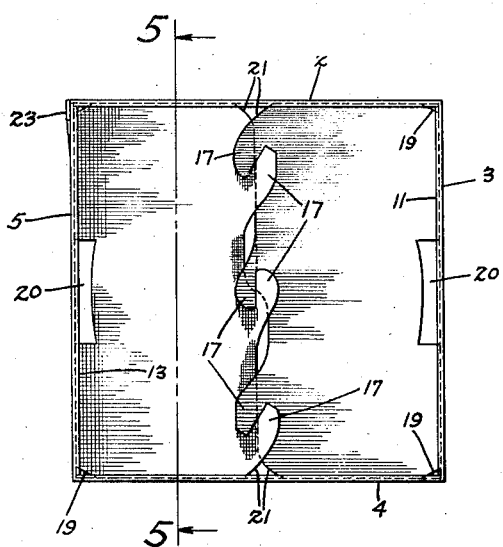
Figure 5:
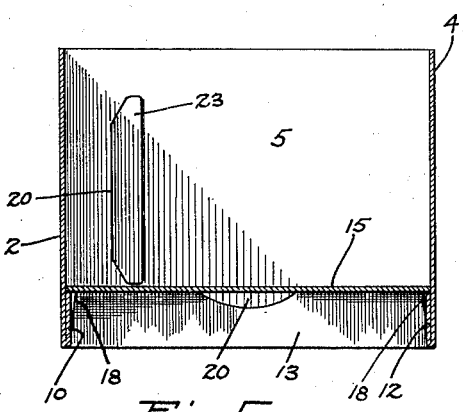

In my co-pending application above referred to, there is described and claimed a motorcycle having a rigid frame comprising a pair of substantially horizontally spaced side bars between the ends of which the wheels of the cycle are mounted. The front wheel is resiliently mounted to take up road shocks. The attached drawings illustrate the forward ends of the spaced side bars 1 and 2 of such a construction. The side bars are bowed outwardly away from each other as at 3—4 to provide, among other objects a wide space for the steering movement of the steering wheel 5. The wheel 5 is revolubly mounted on a collar or hollow axle member 6 through which extends a substantially U-shaped yoke 7 formed at the middle with a boss 14 which is interposed between inwardly projecting lugs 15 formed on the collar 6. The inner surfaces of the lugs and the upper and lower surfaces of the boss are flat and finished so that the collar can turn on the boss. The parts are held together by a pivot pin 9 extending through the boss and lugs. Interposed between the hub 16 of the wheel and collar 6 are ball raceways 17 and 18 to receive the antifriction balls 19, the raceways being held in place by a nut 20 secured to the collar. The pivot pin 9 is slightly inclined from the vertical, the upper end standing further back than the lower end, as is shown by comparison of lines $x$—$x$ and $y$—$y$ of Fig. 2, line $x$—$x$ being a vertical line and line $y$—$y$ the axial line of the pivot. This arrangement is necessary to facilitate balancing and steering, as more fully explained in my co-pending application.

The legs 8 of the yoke extend horizontally rearwardly to points of pivotal attachment 10 in the upstanding ears 11 at the forward ends of the side bars 1 and 2. Brackets 11 extend forwardly from the ends of the side bars and carry upwardly extending suspension rods 12. The suspension rods 12 pass loosely through the legs 8 of the yoke and above the yoke legs are surrounded by coil springs 13. Springs 13 have a bearing on the upper side of the yoke legs 8 and are securely anchored at the upper ends of the rods by clamping nuts.

This construction provides a unitary axle and mounting for the front wheel which resiliently supports the motorcycle frame. The construction readily lends itself to manufacture and provides for ease in assembling.

It is apparent that modifications may be made in the specific construction described, which nevertheless fall within the scope of the invention as defined by the appended claim.

What I claim as new and desire to secure by Letters Patent of the United States is—

In a motorcycle, the combination of a front wheel, a frame having a pair of substantially horizontal members extending on opposite sides of said front wheel, a yoke the ends of which are pivoted to said frame members at points back of the forward ends thereof April 28, 1925.

E. O. NORDSTROM

BERRY BOX 1,535,436

Filed Oct. 22, 1921    2 Sheets-Sheet 1

Inventor
EDWARD O. NORDSTROM

By Paul Hart
Attorneys

April 28, 1925.  1,535,436
E. O. NORDSTROM
BERRY BOX
Filed Oct. 22, 1921   2 Sheets-Sheet 2

Inventor
EDWARD O. NORDSTROM
By Paul Paul
Attorneys